(No Model.) 2 Sheets—Sheet 1.
J. JACKSON.
SPRING FOR VEHICLES.
No. 349,221. Patented Sept. 14, 1886.
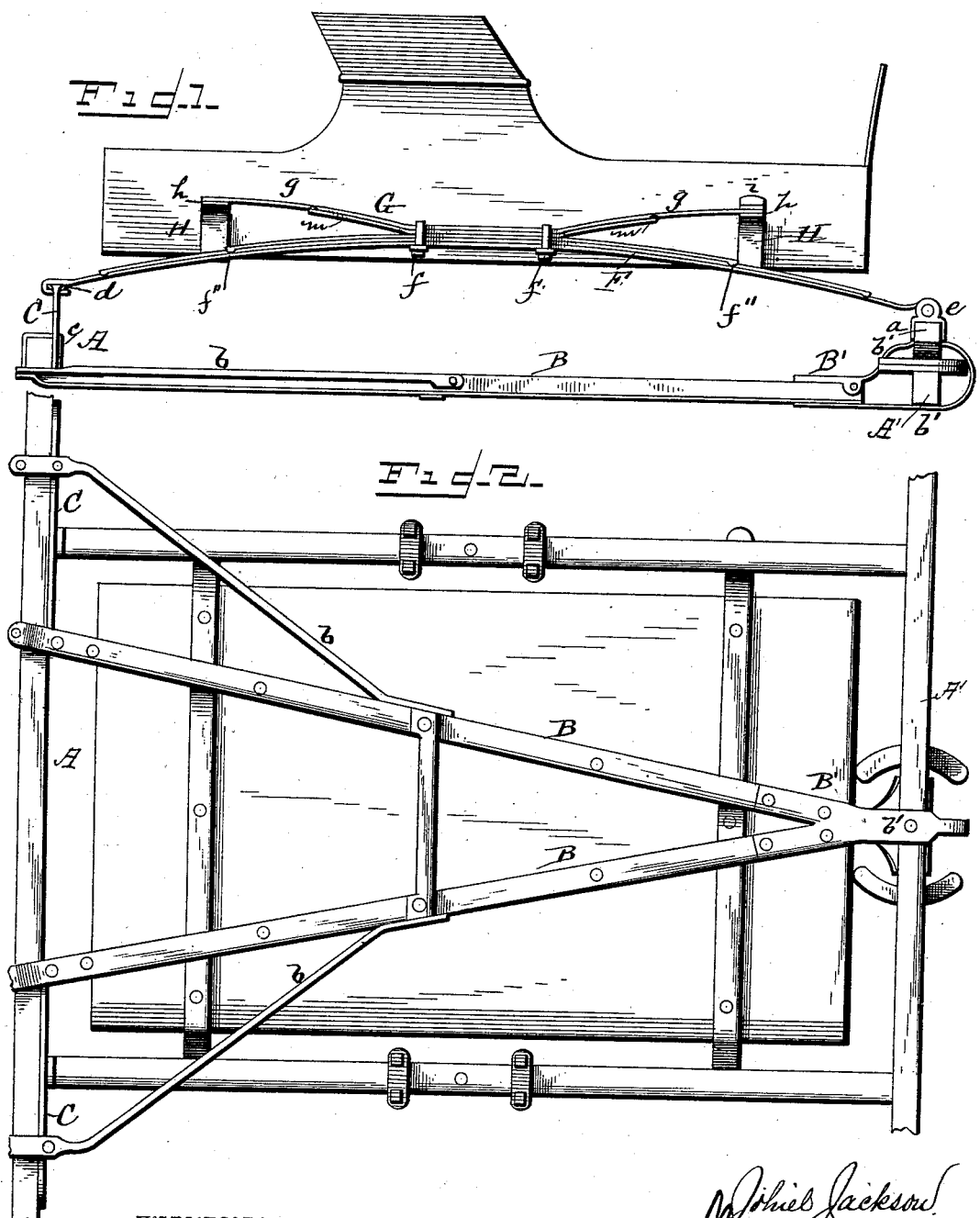
WITNESSES
INVENTOR
Attorney (No Model.) 2 Sheets—Sheet 2.
J. JACKSON.
SPRING FOR VEHICLES.
No. 349,221. Patented Sept. 14, 1886.
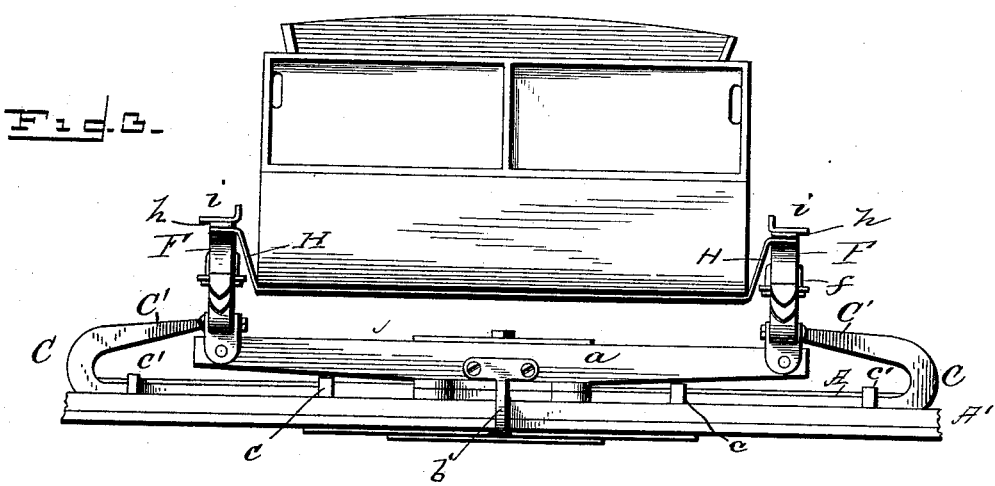
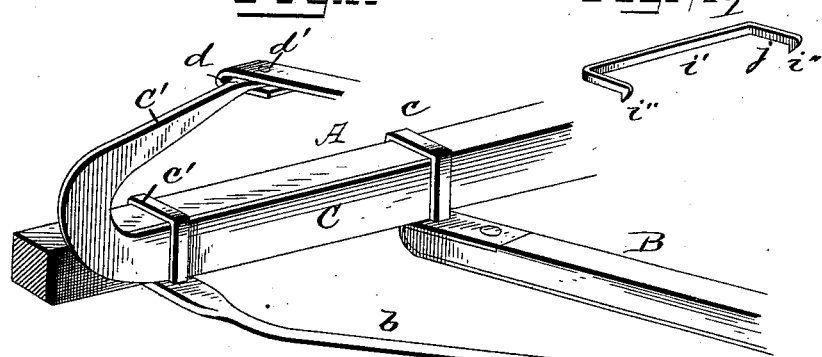
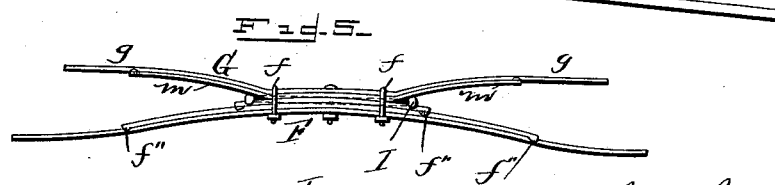
WITNESSES
INVENTOR
Attorney

UNITED STATES PATENT OFFICE.

JOHIEL JACKSON, OF FORT ATKINSON, WISCONSIN.

SPRING FOR VEHICLES.

SPECIFICATION forming part of Letters Patent No. 349,221, dated September 14, 1886.

Application filed July 8, 1886. Serial No. 207,470. (No model.)

*To all whom it may concern:*

Be it known that I, JOHIEL JACKSON, a citizen of the United States of America, residing at Fort Atkinson, in the county of Jefferson and State of Wisconsin, have invented certain new and useful Improvements in Springs for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in springs, the object of my improvement being to provide a novel spring for side-spring vehicles that will be comparatively cheap in construction and effective in operation, so as to provide an easy-riding vehicle; and to this end my invention consists in the construction and combination of the parts, as will be hereinafter fully set forth, and specifically pointed out in the claims.

In the accompanying drawings, which illustrate my invention, Figure 1 is a side view showing my improved side spring attached to a vehicle. Fig. 2 is a plan view of Fig. 1. Fig. 3 is an end view, looking toward the front end of the vehicle. Fig. 4 is a detail perspective view of a rear portion of a vehicle, showing a part of my improvement applied thereto. Fig. 5 is a side view of my improved spring detached from a vehicle, said view showing my improved stiffener-bar applied to said spring. Fig. 6 is a sectional view taken through the line $x$ $x$ of Fig. 5, and Fig. 7 is a detail perspective view of the stiffening device detached from the vehicle.

A refers to the rear axle, which is connected to the front axle, A', and bolster $a$ by the converging reach-bars B B, said bars being braced to the rear axle by braces $b\,b$. The front portion of the reach is provided with the usual head-block, B', with curved plates $b'$, between which the fifth-wheel is located, these plates $b'\,b'$ being attached to the front axle and bolster $a$ in any suitable manner.

$c\,c'$ refer to clips for attaching the rear ends of the reach-bars B B and the braces $b\,b$ to the hind axle, said clips also serving to hold and maintain in position a flat bar, C, which is provided with an upwardly and inwardly curved portion, C', the terminal portion of which is flattened, as shown at $d$. The inner ends of the bars or plates C will be located on a line with the outer ends of the bolster $a$, to which the side springs, F, are attached. The bars C, owing to their peculiar construction, will be light and perfectly rigid against vertical movement.

To the ends of the bolster $a$ are attached clips $e$, which are provided with downwardly-projecting ears for securing the same to the bolster, and upwardly-projecting ears, through which pass bolts for pivotally attaching thereto the semi-elliptical side springs, F. The springs F have the lower plates thereof bent at their rear ends upon themselves, so that they will embrace the flat terminal portion, $d$, of the bar or support C, to which said springs are attached by means of bolts $d'$. The front ends of said springs F are formed into eyes, through which pass securing-bolts. The lower portion of the spring F, hereinbefore referred to, consists of a suitable number of leaves or plates, the ends of said plates or leaves each being provided on both sides with downwardly-projecting portions $f''$, which will lie over the edges of the leaf adjacent thereto. The center of the spring F should be a slight distance nearer the rear axle than the forward axle. The upper plate, G, of the spring F has an upper long leaf, $g$, the ends of which extend upwardly and are supported by shorter leaves $m$, as shown. The ends of the long leaves $g$ are secured to transverse straps H H in any suitable manner. The leaves of the side spring are secured to each other by clips $f\,f$. The straps H H extend under the body of the vehicle, the end portion thereof being bent upwardly and outwardly, and the outwardly-projecting portions $h$ have the ends of the spring $g$ secured to them by means of suitable bolts or clips. Above the raised front end portion of the side spring a strap with footrest $i$ is secured by the same bolt which attaches the strap H to said spring.

Instead of flattening the end of the bar C, it may be given a half twist or turn, so as to bring the end portion to a horizontal position.

When it is desired to stiffen the spring, I make use of the bar I, as shown in Fig. 7, said bar having a straight portion, $i'$, which is of a greater length or distance between the clips *f f*. This bar is then bent outwardly at each end, as shown at *j*, and is provided with downwardly-projecting portions *i″*, which will lie above the top plate of the spring F. The bar I may be advantageously used when two persons are riding in the vehicle and one is of greater weight than the other, or it may be used between the leaves of the spring should the vehicle sag more on one side than the other. This bar I is simple in construction, and may be readily applied to and detached from my improved style of side spring.

The spring hereinbefore described is simple in construction, and will permit the body to have a free vertical movement as well as a lateral movement, and sufficient backward or forward movement of the body is provided for by the bent portion C′ of the bar C to relieve the vehicle from jars in the line of draft.

I do not wish to confine myself particularly to the precise form of spring or the construction of the parts hereinbefore shown and described, but reserve the right to modify my invention within the scope of my claims.

I claim—

1. In combination with a side spring for vehicles, having leaves which diverge from each other, a detachable stiffening-bar, I, adapted to be placed between the springs at or near their diverging points, substantially as shown, and for the purpose set forth.

2. As a new article of manufacture, a stiffening-bar, I, having the end portions bent outwardly and downwardly, substantially as shown.

3. In combination with the side spring, F, consisting of a series of leaves which are secured to each other, spring G, secured above the same, and a stiffener-bar, I, adapted to be inserted between said springs and maintained in position by downwardly-projecting portions *i″*, which embrace the edges of the lower spring, substantially as shown.

4. In a side-spring vehicle, a spring having diverging sections, as shown, which are attached centrally to each other, the ends of the lower section being attached to bent bars secured to the rear axle, and the front ends to the bolster *a*, the ends of the upper sections being attached to straps H H, substantially as shown, and for the purpose set forth.

5. In a vehicle, the combination of the longitudinal springs attached at their forward ends to the bolster and at their rear ends to bent bars which project above the plane of the rear axle and an upper diverging section attached to the longitudinal springs and to straps which are secured to the body, substantially as shown, and for the purpose set forth.

6. In a vehicle having running-gear of ordinary construction, the upwardly and inwardly projecting bars C, attached to the rear axle so that their ends will be on a line with the bolster which is secured to the forward axle, side springs attached to the bolster and said bent bars, and means for connecting the same to the wagon-body, substantially as shown, and for the purpose set forth.

In testimony whereof I affix my signature in presence of two witnesses.

JOHIEL JACKSON.

Witnesses:
GEO. C. SMITH,
CARL WANDSCHNEIDER.